No. 793,841. PATENTED JULY 4, 1905.
G. W. LEAVENWORTH.
TRAP.
APPLICATION FILED MAR. 3, 1905.
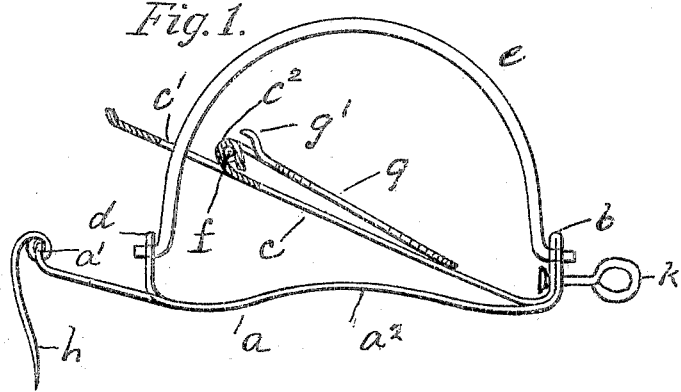
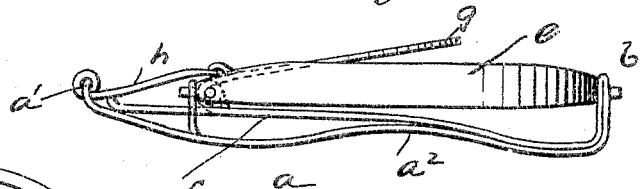
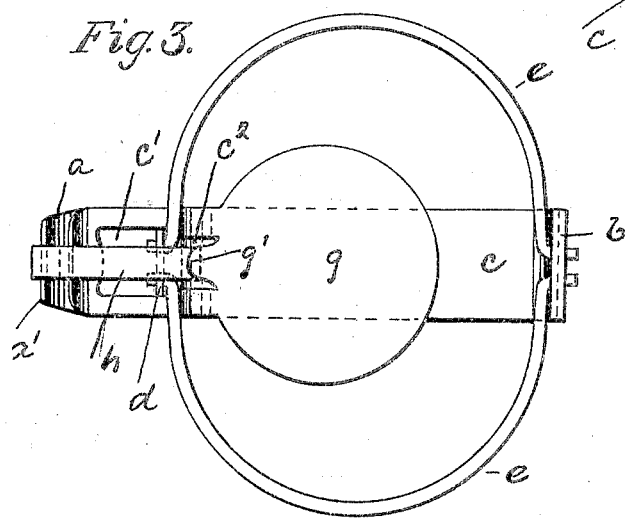
Witnesses:
F. H. Elliott
D. Kuinendahl
Inventor:
George W. Leavenworth
by N. E. Hart No. 793,841. Patented July 4, 1905.

UNITED STATES PATENT OFFICE.

GEORGE W. LEAVENWORTH, OF BRISTOL, CONNECTICUT.

TRAP.

SPECIFICATION forming part of Letters Patent No. 793,841, dated July 4, 1905.

Application filed March 3, 1905. Serial No. 248,237.

*To all whom it may concern:*

Be it known that I, GEORGE W. LEAVENWORTH, a citizen of the United States of America, residing at Bristol, in the county of Hartford and State of Connecticut, have invented certain new and useful Improvements in Traps, of which the following is a specification.

The object of the invention is to produce an article of the character described having features of novelty and advantage.

In the drawings, Figure 1 is a side elevation of a trap made in accordance with my invention. Fig. 2 is a side elevation, but with the trap set. Fig. 3 is a plan view of the trap set.

What may be termed the "base" $a$ of my trap is made of a strip of metal which is bent up, as at $b$, to form a pivot-bearing for the jaws, then down, and then extends back and up, forming the jaw-closing spring $c$. The other pivot-bearing for the jaws is preferably formed by bending up the ear $d$, which is cut out of the metal of the base on three sides. The jaws $e\ e$ are pivoted to their bearings in the usual manner, passing at one end through an opening $c'$ in the jaw-closing spring $c$. Part of the metal cut out of the spring $c$ to form said opening is rolled over to form a knuckle $c^2$, through which a pin $f$ passes, by which the pan $g$ is hinged to the spring $c$. The pan is provided with the usual catch $g'$, coöperating with a tongue $h$, hung on the upturned end $a'$ of the base $a$. The base is slightly bowed, as at $a^2$, to give it a spring effect in connection with the closing-spring $c$.

In order to set the trap, the spring $c$ is depressed, allowing the jaws to be opened flat, as shown in Figs. 2 and 3, and the tongue $h$ is swung over between the jaws, engaging the end of the closing-spring, as clearly seen in Fig. 2, its end being caught under the catch $g'$ on the pan $g$. While the spring $c$ is held depressed by the tongue $g$ the jaws will remain in their open position. The trap is sprung in the usual manner by disengaging the pan from the tongue, releasing the spring $c$, which immediately flies up and closes the jaws.

$k$ is the swivel by means of which the trap may be secured by a chain or similar device.

Many advantages of a trap made in accordance with my invention will be apparent on examination. The formation of the jaw-closing spring in the manner shown and preferably as an integral part of the base is an inexpensive and extremely-efficient construction. The entire absence of rivets, which tend to weaken the parts through which they pass, will also be noted.

My trap is not set by locking one jaw and leaving the other free, but by locking the spring, or what would be equivalent thereto, locking both jaws by having the tongue pass between them. This holds both jaws in the same plane and in the most wide-open position and so balanced that when the trap is sprung it will jump directly up.

I am aware that the embodiment of my invention illustrated and described herein is susceptible of alteration and modification without departing from the spirit of the invention.

I claim as my invention—

1. In a trap a base, a jaw-closing spring secured together at one end, jaws suitably mounted, and a setting device comprising a tongue and a pan mounted on opposite sides of the pivotal support for one end of said jaws, said pan having a catch which is engaged by said tongue to set the trap, one member of said setting device being mounted on said spring.

2. In a trap a base, a jaw-closing spring, jaws, a pan mounted on said spring and having a catch, and a tongue mounted on said base and adapted for coöperation with said catch, as and for the purposes specified.

3. In a trap a base, a jaw-closing spring, secured together at one end, jaws, a pan mounted on said spring and having a catch, and a tongue mounted on said base and adapted for coöperation with said catch, as and for the purposes specified.

4. In a trap a base and an integral jaw-closing spring, jaws, a pan mounted on said spring and having a catch, and a tongue mounted on said base and adapted for coöperation with said catch, as and for the purposes specified.

5. In a trap a base and a jaw-closing spring formed in one piece of metal, jaws, pivot-bearings therefor formed integrally with said base, a pan hinged to the spring having a catch, and a tongue coacting with said catch and hinged to the base and overlying said jaws to engage said spring when the trap is set.

6. In a trap a base bent up at one end to form a pivot-bearing for the jaws, a second pivot-bearing formed on said base, a jaw-closing spring secured at one end of the base, jaws suitably supported with one end passing through an opening in said spring, a pan hinged to said spring, and a tongue hinged to the end of the base and adapted to engage the free end of the spring and interlock with the pan.

7. A spring-base, part of which forms pivotal bearings, jaws secured in said bearings, a jaw-closing spring secured to one end of said base, a setting device, one member of which is mounted on said jaw-closing spring.

In testimony whereof I affix my signature in presence of two witnesses.

GEORGE W. LEAVENWORTH.

Witnesses:
H. E. HART,
D. S. KREIMENDAHL.